US010717345B2

(12) United States Patent
Fierro

(10) Patent No.: US 10,717,345 B2
(45) Date of Patent: Jul. 21, 2020

(54) AUXILIARY AIR-CONDITIONING SYSTEM FOR OVER-THE-ROAD TRUCKS

(71) Applicant: Frank Fierro, Midland, TX (US)

(72) Inventor: Frank Fierro, Midland, TX (US)

( * ) Notice: Subject to any disclaimer, the term of this patent is extended or adjusted under 35 U.S.C. 154(b) by 141 days.

(21) Appl. No.: 16/081,443

(22) PCT Filed: Mar. 6, 2017

(86) PCT No.: PCT/US2017/020944
§ 371 (c)(1),
(2) Date: Aug. 31, 2018

(87) PCT Pub. No.: WO2017/155880
PCT Pub. Date: Sep. 14, 2017

(65) Prior Publication Data
US 2019/0092136 A1    Mar. 28, 2019

Related U.S. Application Data

(60) Provisional application No. 62/305,983, filed on Mar. 9, 2016.

(51) Int. Cl.
| | |
|---|---|
| *F25D 23/12* | (2006.01) |
| *B60H 1/32* | (2006.01) |
| *B60H 1/00* | (2006.01) |
| *F02N 19/10* | (2010.01) |
| *F25B 6/00* | (2006.01) |

(52) U.S. Cl.
CPC ....... *B60H 1/3232* (2013.01); *B60H 1/00278* (2013.01); *B60H 1/00428* (2013.01); *B60H 1/3226* (2013.01); *F02N 19/10* (2013.01); *F25B 6/00* (2013.01); *B60H 2001/00307* (2013.01); *F01P 2070/04* (2013.01); *Y02T 10/88* (2013.01)

(58) Field of Classification Search
CPC .............. B60H 1/3232; B60H 1/00278; B60H 1/00428; B60H 1/3226; B60H 1/323; B60H 1/00885; B60H 1/00378; B60H 1/32281; B60H 2001/00307; B60H 2001/00928; B60L 1/003; B60L 58/26; F02N 19/10; F01P 2070/04; F25B 6/00
See application file for complete search history.

(56) References Cited

U.S. PATENT DOCUMENTS

| | | | | |
|---|---|---|---|---|
| 2013/0047648 | A1* | 2/2013 | Zeigler | B60H 1/00428 62/133 |
| 2014/0318170 | A1* | 10/2014 | Katoh | F28D 1/0408 62/324.5 |

FOREIGN PATENT DOCUMENTS

WO    WO-9961269 A2 * 12/1999    ......... B60H 1/00478

* cited by examiner

*Primary Examiner* — Henry T Crenshaw
*Assistant Examiner* — Kamran Tavakoldavani
(74) *Attorney, Agent, or Firm* — William Lovin & Assoc., LLC; William R. Lovin

(57) ABSTRACT

The invention relates to a system that is added to a standard vehicle installed air-conditioning system that allows the standard vehicle installed air-conditioning system to cool and condition the air inside the vehicle without operating the engine of the vehicle. This allows the vehicle to be air-conditioned without polluting the air via continuous operation of the vehicle's (usually) diesel engine. Also, a thermal heating tank is included to warm the electrical components of the system and to ensure improved morning starting of the vehicle's engine.

6 Claims, 2 Drawing Sheets

AUXILIARY AIR-CONDITIONING SYSTEM FOR OVER-THE-ROAD TRUCKS

CROSS-REFERENCE TO RELATED APPLICATIONS

This application takes priority from U.S. Prov. Pat. 62/305,983 filed Mar. 9, 2016 which it incorporates in its entirety by reference.

FIELD OF THE INVENTION

The present invention relates generally to the augmentation of standard vehicle installed air-conditioning systems. More specifically, the invention relates to a system that is added to a standard vehicle installed air-conditioning system that allows the standard vehicle installed air-conditioning system to cool and condition the air inside the vehicle without operating the engine of the vehicle. This allows the vehicle to be air-conditioned without polluting the air via continuous operation of the vehicle's (usually) diesel engine. Also, a thermal heating tank is included to warm the electrical components of the system and to ensure improved morning starting of the vehicle's engine.

BACKGROUND OF THE INVENTION

Truck drivers haul thousands of pounds of materials thousands of miles every day. Due to state and federal regulations, these drivers can only log certain numbers of hours each day they are on the road. As a result, long-distance truck drivers often sleep in their trucks between service days. Naturally, they require air-conditioning during this off time. Accordingly, most truck drivers operate their main (or a smaller auxiliary) diesel engine simply to power the air-conditioner. Diesel engine technology is cleaner from an emissions point-of-view than it was years before, but it is still relatively dirty. What is needed then is a system that may be affixed to a standard over-the-road truck that allows the operator to limit the amount of time that his main (or auxiliary) diesel engine is running yet still use the air-conditioner as needed during off time between driving sessions. This is the goal of the present invention. Further, since the driver is expected to disable the vehicle's engine during overnight stays, the invention includes a thermal heating tank plumbed into the truck's cooling system. The thermal heating tank warms the invention's batteries and the truck's engine thus enabling smoother starts.

SUMMARY OF THE INVENTION

According to one embodiment of the present invention, a system for allowing the operator of an over-the-road truck to operate the air-conditioner installed in the vehicle without the need of operating the truck's main (or auxiliary) internal combustion engine is disclosed.

According to one embodiment, the invention relates to an auxiliary air-conditioning system that: 1) Compresses Freon®; 2) Possesses a condensing coil, 3) Possesses an alternator; and, 4) Possesses an external thermal heating tank interoperating with the cooling system of the engine.

The auxiliary air-conditioning is installed in the standard air-conditioning system so that condensed, compressed refrigerant is injected into the standard vehicle installed air-conditioning system prior to the standard expansion valve in the vehicle installed air-conditioning system. Lower pressure, warmer refrigerant is collected from the standard vehicle installed air-conditioning system as it returns from the evaporator coil. This lower pressure, warmer refrigerant is re-pressurized and the cycle repeats.

The thermal heating tank is located in close proximity to the batteries contained in the invention and plays a role in securing their thermal stability. The thermal heating tank is also plumbed into the cooling system of the vehicle's main engine. The thermal heating tank also has an electrical heating element and a pump installed. Both the electrical heating element and the pump are wired to the battery of the invention. Through this arrangement, fluid in the electrical heating tank is warmed and pumped through the engine of the vehicle ensuring better starts even while the engine of the vehicle is disabled.

DETAILED DESCRIPTION OF THE EMBODIMENTS

Figure 1:
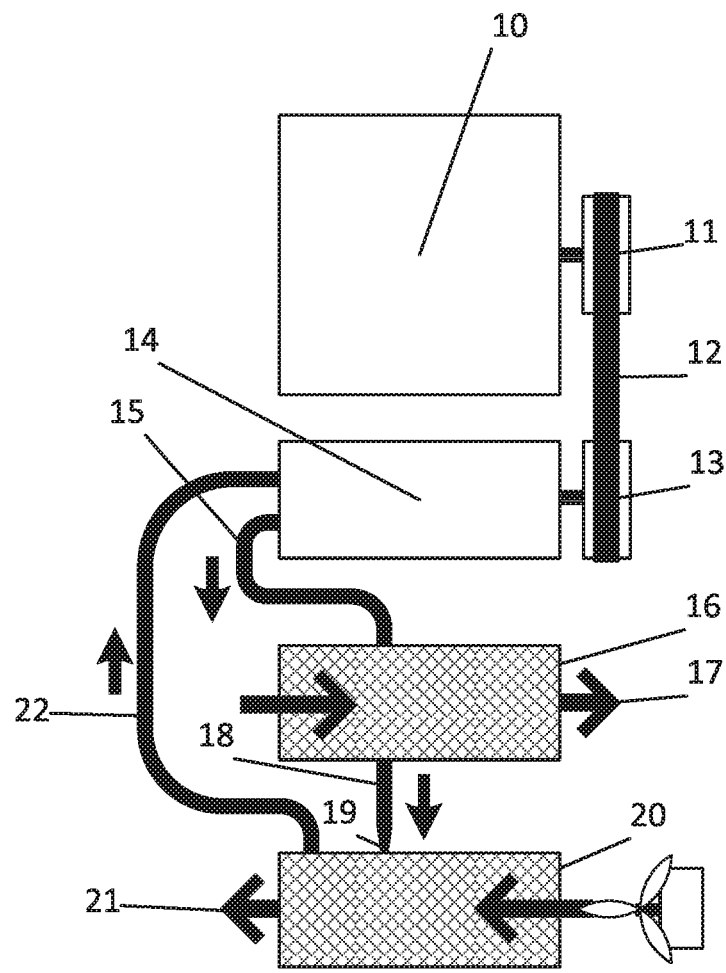
FIG. 1 shows a block diagram of a prior art air-conditioning system.

Referring now to FIG. 1, a block diagram of prior art vehicular mounted air-conditioning system is show. Standard vehicular compressor 14 is mechanically coupled to motor 10 by means of belt 12. Belt 12 runs in belt guides 11 and 13. Standard vehicular compressor 14 is energized as needed by means of a clutch in belt guide 13. Motor 10 is ordinarily the main motor of the vehicle. Such motors are powered by diesel, gasoline, LPG/LNG and so on. Alternately, motor 10 may be an accessory motor.

Standard vehicular compressor 14 compresses the refrigerant. The refrigerant may be any chloro/fluorocarbon compound suitable for the task. Ordinarily, R134A is used in vehicles, but there are numerous other refrigerants currently deployed and/or under development and deployment. For example, HFO-1234yf is currently under wide deployment in vehicular air-conditioning systems. Also, R12, R152A, and R774 (or refrigerant grade $CO_2$) have been used.

Compressed R134A is under pressure and is hot. Hot, compressed R134A travels first to condensing coil 16. Ordinarily, condensing coil 16 is exposed to ambient air where ambient cooling air 17 flows through condensing coil 16 to cool the compressed coolant. Ambient cooling air 17 flows through condensing coil 16 naturally, by moving the condensing coil forward through the atmosphere, or, condensing coil 16 may stay fixed in the atmosphere and ambient cooling air 17 may be forced through condensing coil 16. Either way, compressed coolant is cooled from the hot state in which it is presented to condensing coil 16.

Cooled, compressed R134A travels next to transfer line 18 and expansion valve 19. Expansion valve 19 is a flow restricting device that causes a pressure drop in the cooled compressed R134A as cooled, compressed R134A travels through the expansion valve. Upon exiting expansion valve 19, the R134A is at lower pressure, gaseous, and cold. Simultaneously, the cold R134A gas flows into and through vehicular evaporator coil 20. Vehicular evaporator coil 20 is associated with an electrically powered blower and ambient air is blown through vehicular evaporator coil 20. By this means the warm ambient cooled occupant cabin air 21 is cooled while the R134A is heated and forms a warm gas.

The warm low pressure gaseous R134A is routed for recompression by standard vehicular compressor 14 by means of suction line 22.

Figure 2:
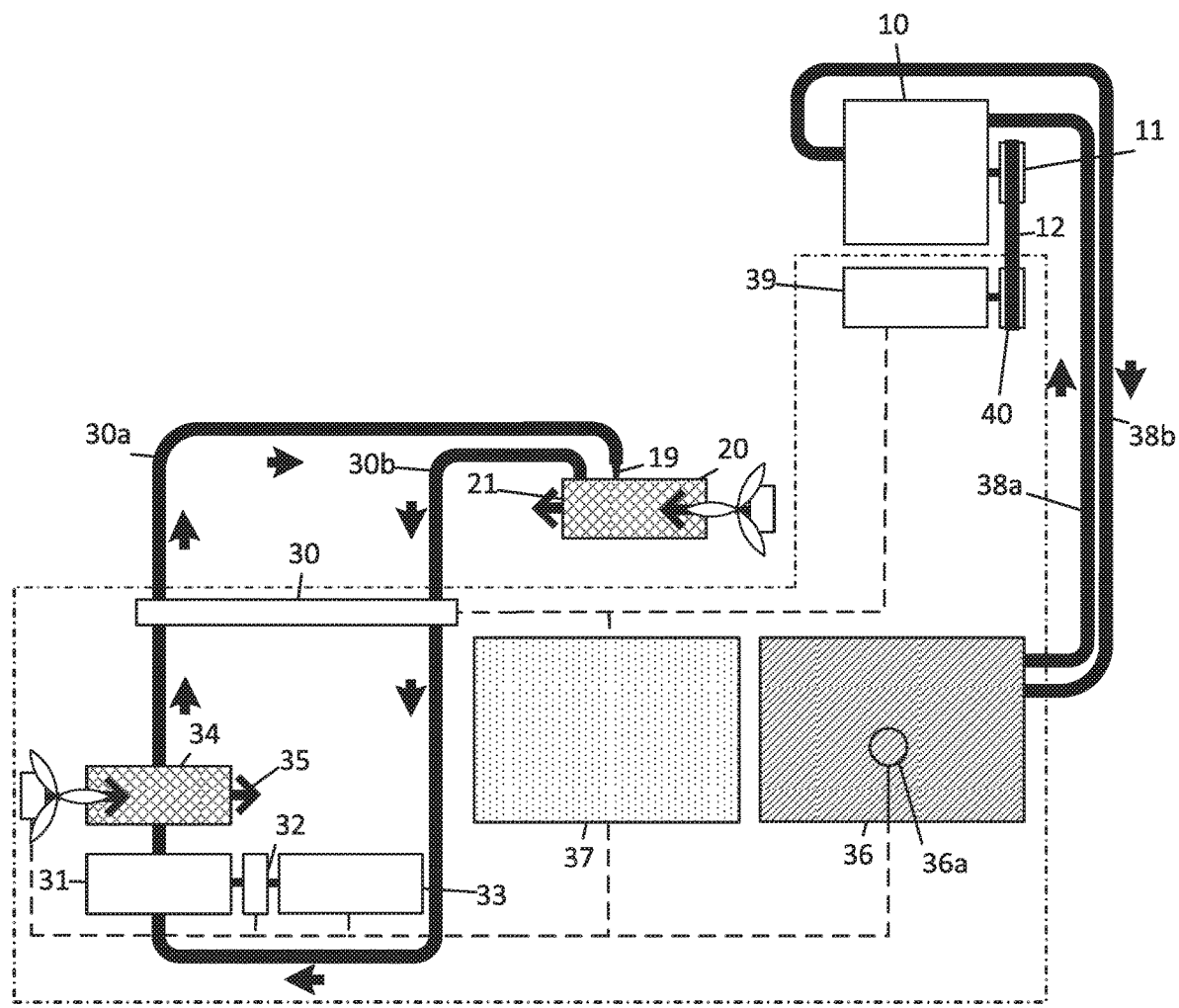
FIG. 2 shows a block diagram of one embodiment of the present invention used in concert with a prior art air-conditioning system.

Referring now to FIGS. 1 and 2, one embodiment of the present invention is disclosed. This embodiment of the present invention is constructed to be integrated with a typical vehicular air-conditioner. In this embodiment of the invention, high-pressure line 30a is plumbed into the vehicular air-conditioning system on the high pressure side of expansion valve 19. Similarly, low pressure line 30b is plumbed into the vehicular air-conditioner on the low pressure side of vehicular evaporator coil 20. Also, high-pressure (pumped) coolant line 38a is plumbed into the engine's cooling system at any arbitrary point. Finally, low pressure coolant return line 38b is plumbed into the engine's coolant system at an arbitrary point thermally opposite the point where high-pressure (pumped) coolant line 38a is plumbed into the engine's cooling system.

Fluidic access for R134A to the invention is enabled by electric access valve 30. When the system is disabled, electric access valve 30 is closed, closing fluidic access by R134A in lines 30a and 30b. When the system is enabled, electric access valve 30 is open, opening fluidic access by R134A in lines 30a and 30b. Fluidic access for coolant to coolant tank 36 is always provided to the cooling system of the engine. As a result the fluid in coolant tank 36 achieves thermal equilibrium with the coolant as it circulates through the engine.

When electric access valve 30 is open, hot gaseous R134A in low pressure line 30b is collected by the present invention and routed to compressor 31. Compressor 31 is powered by electric motor 33 by means of electric clutch 32. Hot gaseous R134A is compressed by compressor 31 and exits it as high pressure, high temperature gaseous R134A. This is routed to condensing coil 34 where it travels through a heat exchanger where atmospheric air 35 is blown through condensing coil 34. This causes the conversion of the high pressure, high temperature gas to high pressure, low temperature liquid.

This high pressure, low temperature liquid is routed through electric access valve 30 into high-pressure line 30a where it is injected into the vehicular air-conditioning system just prior to expansion valve 19. At expansion valve 19, the vehicular air-conditioning system functions as it does when pressurized R134A is created by standard vehicular compressor 14, i.e. the expansion valve causes a rapid reduction in pressure of the high pressure, low temperature liquid R134A. When this happens, the high-pressure, low temperature liquid R134A evaporates and forms a lower pressure, lower temperature gas to flow through vehicular evaporator coil 20. The electric blower associated with vehicular evaporator coil 20 forces warm ambient occupant cabin air 21 through vehicular evaporator coil 20. This lowers the temperature of warm ambient occupant cabin air 21. The R134A then returns through electric access valve 30 to be compressed and used again.

The system is powered by battery 37. Battery 37 is wired to alternator 39. Alternator 39 replaces standard vehicular compressor 14 and serves to charge battery 37. It will be readily obvious that alternator 39 may be replaced by a conventional generator. Battery 37 is also wired to thermal heating element 36a inside coolant tank 36. Thermal heating element 36a is automatically activated to keep coolant in coolant tank 36 at a relatively constant level. Battery 37 also powers the pump used to circulate coolant from coolant tank 36 through motor 10 by means of high-pressure (pumped) coolant line 38a and low pressure coolant return line 38b. Coolant tank 36 is physically associated with battery 37. This arrangement provides thermal stability to battery 37.

The disclosed embodiment of the invention is mounted on a tractor vehicle or other motorized commercial trucking platform. Ordinarily, the unit is mounted behind the cab of the tractor between the hitch of the tractor and the rear surface of the tractor. Accordingly, the unit is relatively tall and wide yet thin in the dimension from the back of the rear surface of the tractor towards the hitch. This thinness is provided so that the tractor can maneuver when towing a trailer.

The invention claimed is:

1. An auxiliary air-conditioning system for over-the-road trucks comprising:
   a. a battery;
   b. an alternator driven by the associated vehicle's engine;
   c. a condensing coil with electric fan;
   d. a compressor compressing refrigerant driven by an electric motor by means of an electric clutch;
   e. an electric access valve with a high-pressure output port and a low-pressure input port;
   f. a coolant tank with integral electric heating element and pump;
   g. wherein the battery powers the electric access valve, the electric motor, the electric clutch, the electric fan, the electric heating element, and the pump;
   h. wherein the battery is configured to be charged by the alternator when the associated vehicle's engine is running;
   i. wherein the refrigerant output of the compressor flows through the condensing coil and out of the auxiliary air-conditioning system via the high-pressure port of the electric access valve whereupon it is then injected into a vehicular installed air-conditioning system just upstream of the expansion valve;
   j. wherein the refrigerant input to the auxiliary air-conditioning system is collected just downstream of the evaporator coil of the vehicular installed air-conditioning system and flows via the low-pressure port of the electric access valve into the compressor;
   k. wherein the output of the pump flows from the coolant tank into the cooling system of the associated vehicle's engine;
   l. wherein the input of the coolant tank receives coolant from the associated vehicle's engine.

2. An auxiliary air-conditioning system of claim 1 in which the refrigerant is R134A.

3. An auxiliary air-conditioning system of claim 1 in which the refrigerant is HFO-1234yf.

4. An auxiliary air-conditioning system of claim 1 in which the coolant tank and the battery are physically coupled such that the coolant tank provides thermal stability to the battery.

5. An auxiliary air-conditioning system of claim 1 in which the output of the pump flows from the coolant tank to the cooling system of the associated vehicle's engine such that the coolant provides thermal stability to the cooling system of the associated vehicle's engine.

6. An auxiliary air-conditioning system of claim 1 in which the output of the pump flows from the coolant tank to the cooling system of the associated vehicle's engine such that the vehicle's engine starts more easily when it is cold.

* * * * *